United States Patent
Lee et al.

(10) Patent No.: US 8,926,300 B2
(45) Date of Patent: Jan. 6, 2015

(54) MICRO PARTICLE FOR THERMAL CONTROL MATERIAL AND DEVICE AND METHOD OF PRODUCING THE SAME USING ULTRASONIC HIGH-TEMPERATURE VIBRATION SCHEME

(75) Inventors: Han Saem Lee, Gyeonggi-do (KR); Do Suck Han, Gyeonggi-do (KR); Jin Woo Kwak, Gyeonggi-do (KR); Chi Hoon Choi, Gyeonggi-do (KR); Kyong Hwa Song, Seoul (KR); Byung Sam Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 237 days.

(21) Appl. No.: 13/405,595

(22) Filed: Feb. 27, 2012

(65) Prior Publication Data
US 2013/0140483 A1 Jun. 6, 2013

(30) Foreign Application Priority Data
Dec. 5, 2011 (KR) .......................... 10-2011-0129101

(51) Int. Cl.
*B22F 9/06* (2006.01)

(52) U.S. Cl.
USPC ...................... 425/6; 425/10; 264/12; 264/14

(58) Field of Classification Search
CPC ......... B29C 2791/008; B01J 2/02; B01J 2/18; B01J 13/04
USPC ............................ 425/6, 10; 264/9, 12, 13, 14
See application file for complete search history.

(56) References Cited

U.S. PATENT DOCUMENTS

| | | | | |
|---|---|---|---|---|
| 3,830,079 A * | 8/1974 | Horsewell et al. | ................. | 425/6 |
| 5,482,532 A * | 1/1996 | Isshiki et al. | ....................... | 425/7 |
| 6,676,890 B2 * | 1/2004 | Chaleat et al. | .................... | 425/6 |
| 7,514,145 B2 * | 4/2009 | Akioka et al. | .................... | 425/6 |
| 8,501,055 B2 * | 8/2013 | Ohtani et al. | ..................... | 425/6 |

FOREIGN PATENT DOCUMENTS

| | | |
|---|---|---|
| JP | 2008297503 A | 12/2008 |
| KR | 10-2000-0014627 | 3/2000 |
| KR | 10-2006-0059138 | 6/2006 |
| KR | 10-2010-0030707 | 3/2010 |
| WO | 9420195 A1 | 9/1994 |

* cited by examiner

*Primary Examiner* — Joseph S Del Sole
*Assistant Examiner* — Thukhanh Nguyen
(74) *Attorney, Agent, or Firm* — Edwards Wildman Palmer LLP; Peter F. Corless

(57) ABSTRACT

Disclosed is a micro particle for a thermal control material capable of being applied as a highly thermal conductive material for thermal control, and an apparatus and a method of producing the micro particle for the thermal control material by using an ultrasonic high-temperature vibration scheme. More specifically, a Boron Nitride (BN) particle having a plate shape and an excellent thermal conductivity is coated on a PCM having a shape of a micro bead, to increase the thermal conduction to the inside PCM, so that a phase change is easily generated, and which allows an easy treatment of the PCM in a liquid state at a temperature equal to or higher than a melting point of the PCM.

4 Claims, 2 Drawing Sheets

MICRO PARTICLE FOR THERMAL CONTROL MATERIAL AND DEVICE AND METHOD OF PRODUCING THE SAME USING ULTRASONIC HIGH-TEMPERATURE VIBRATION SCHEME

CROSS-REFERENCE TO RELATED APPLICATION

This application claims under 35 U.S.C. §119(a) the benefit of Korean Patent Application No. 10-2011-0129101 filed on Dec. 5, 2011, the entire contents of which are incorporated herein by reference.

BACKGROUND (a) Technical Field

The present invention relates to a micro particle for a thermal control material, an apparatus and a method of producing the micro particle for the thermal control material by using an ultrasonic high-temperature vibration scheme. More particularly, the present invention relates to a micro particle for a thermal control material capable of being applied as a highly thermal conductive material for thermal control, and an apparatus and a method of producing the micro particle for the thermal control material by using the ultrasonic high-temperature vibration scheme.

(b) Background Art

The conventional battery radiating system is mainly focused on dissipating heat accumulated inside the system to the outside, and thus it may deteriorate its performance of an entire battery in a low temperature environment. Therefore, there is a need for the development of a thermal control material (e.g., a temperature control material) for maintaining an appropriate temperature within the radiating system rather than the improvement of thermal conduction and radiation performance. Some manufactures have tried to rectify these issues by utilizing a Phase Change Material (PCM) as the thermal control material.

A PCM used in a latent heat storing system has very low thermal conductivity, however, and thus it is difficult to reach an effective thermal exchange rate between a heat transfer fluid and the PCM. In addition, when the PCM is phase changed to a liquid state at a temperature equal to or higher than a melting point of the PCM, it is difficult to treat the to PCM, and thus a capsulation of the PCM is required.

SUMMARY OF THE DISCLOSURE

In order to overcome low thermal conduction and encapsulation, which are limitations of an existing PCM, the present invention provides an apparatus and a method of producing a micro particle for a thermal control material by using an ultrasonic high-temperature vibration scheme, in which a Boron Nitride (BN) particle having a plate shape and high thermal conductivity (e.g., 3 W/mK: in the perpendicular direction, 60 W/mK: in the basal plane) is coated on a PCM having a shape of a micro bead, to increase the thermal conduction to the inside PCM, so that a phase change is easily generated, and which allows an easy treatment of the PCM in a liquid state at a temperature equal to or higher than a melting point of the PCM. That is, for the most part, the thermal conductivity of PCM is nearly 0, however, this prepared microparticle (micro bead) has a thermal conductivity of about 1~10 W/mK depending on the thickness of the microparticle.

In one aspect, the present invention provides an apparatus for producing a micro particle for a thermal control material using an ultrasonic high-temperature vibration scheme More specifically, the apparatus includes a melting tank for melting a Phase Change Material (PCM); an ultrasonic high-temperature vibrator for sonicating and misting the melted PCM; a glass tube in which a carrier gas for carrying a misted PCM micro particle is injected; and a collection container within a collection chamber configured to collect a micro particle solidified while being carried through the glass tube and disposed in an upper end of the glass tube.

In another aspect, the present invention provides a method of producing a micro particle for a thermal control material using an ultrasonic high-temperature vibration scheme. More specifically, the method includes melting a PCM; sonicating the melted PCM with a vibration frequency of at least 3 MHz to generate a misted PCM micro particle; solidifying the PCM micro particle through carrier tubes having a temperature gradient; collecting a solidified PCM micro particle; micro pulverizing Boron Nitride (BN) in a micro unit for coating on a surface of the solidified PCM micro particle; providing a functionality to the micro pulverized plate-shape BN; and coating the surface of the solidified PCM micro particle with a BN micro particle.

In another aspect, the present invention provides a micro particle for a thermal control material in which the solid lauric acid micro particle is formed as a core and the BN particle is formed as a shell according to the apparatus and the method of the present invention.

Advantageously, the plate-type BN particle having excellent conductivity is coated on the PCM shaped like a micro bead so that the conduction to the inside PCM increases, thereby allowing for easy generation of the phase change and treatment of the PCM in a liquid state.

More specifically, the heat is effectively transferred to the PCM so that the properties of the PCM can be maximally achieved. Accordingly, the present invention can be utilized for a highly thermal conductive material for heat control which maintains an appropriate temperature in a battery system.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Hereinafter reference will now be made in detail to various embodiments of the present invention, examples of which are illustrated in the accompanying drawings and described below.

The present invention places emphasis on manufacturing of a micro particle for a thermal control material by using an ultrasonic high-temperature vibration scheme including temperature control and vibration control together with use of a phase change phenomenon of Phase Change Material (PCM).

That is, the present invention is characterized in that it employs a scheme of producing micro-sized particle with high-frequency vibration in a high-temperature melting state, making the produced micro particle pass through a carrier tube having a specific temperature gradient by using a carrier gas, and solidifying the micro particle at a low temperature, to produce the micro particle for a thermal control material.

The produced micro particle improves the thermal conduction to the PCM through coating Boron Nitride (BN) plate-type particle on the PCM micro particle. In this case, it is necessary to minimize a gap between the BN and the PCM generated by a volume difference in the phase change which blocks thermal conduction and introduces functional groups to the plate-type particle in order to stabilize the coating of the BN plate-type particle.

Accordingly, the present invention introduces an amine group and a hydroxyl group and induces a condensation reaction with carboxyl groups of a fatty acid-type PCM based on a defect site increased by a micro pulverization through a milling of the BN particle having excellent heat transfer properties, to improve interface stability between the PCM and the plate-type particle BN, and simultaneously enhance shape stability and minimize the generation of an interface gap generated in the volume change, thereby inducing effective heat transfer.

An apparatus and a method of producing a micro particle for a thermal control material by using an ultrasonic high-temperature vibration scheme according to an embodiment of the present invention will be described in detail below.

Figure 1:
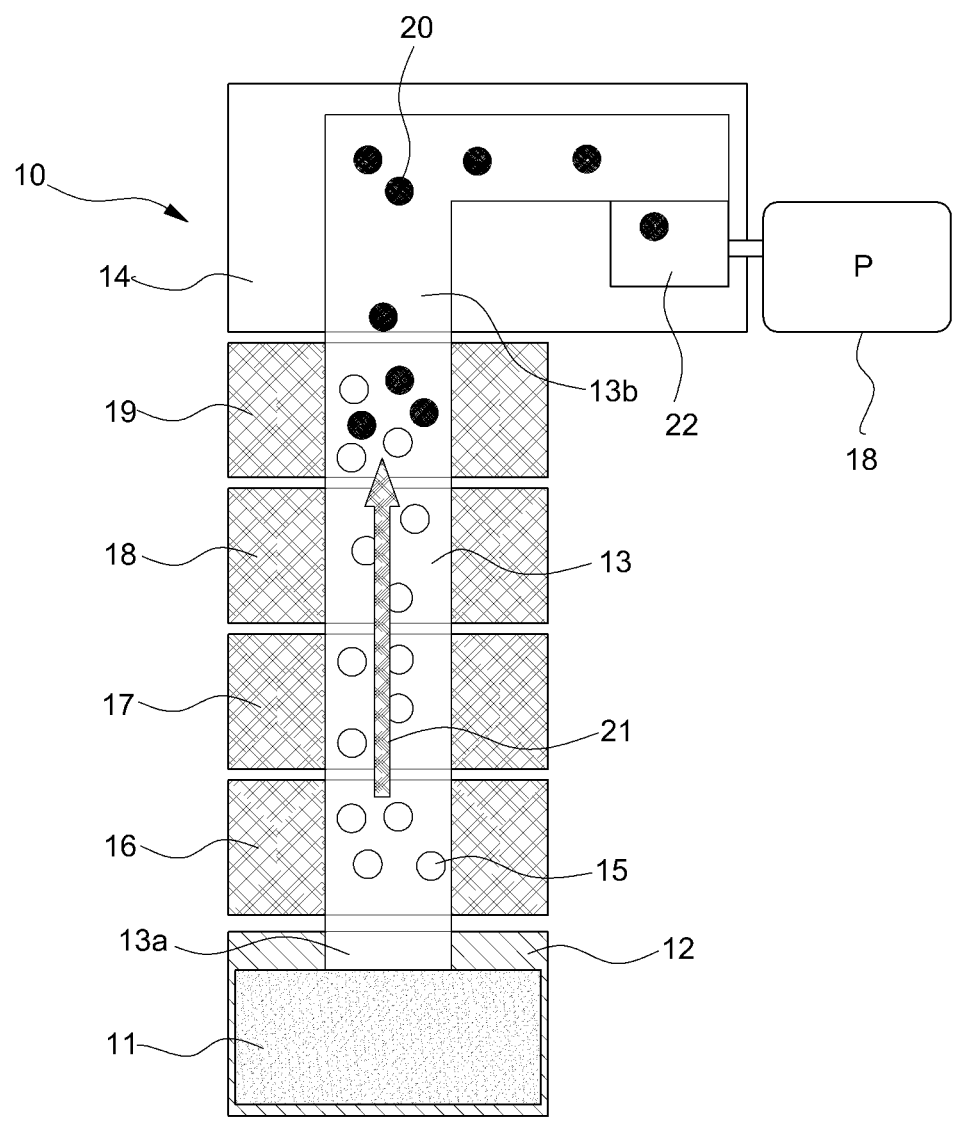
FIG. 1 is a diagram schematically illustrating an apparatus for producing a micro particle for a thermal control material by using an ultrasonic high-temperature vibration scheme according to an exemplary embodiment of the present invention.

FIG. 1 is a diagram schematically illustrating an apparatus for producing a micro particle for a thermal control material by using the ultrasonic high-temperature vibration scheme according to an exemplary embodiment of the present invention. The PCM is a fatty acid known as lauric acid and has a —COOH group at an end thereof so that it can be ionized at a specific pH, and further is insoluble in water so that it is melted in a solvent, such as ethanol and dimethylformamide. A melting point of the PCM is 42° C. Otherwise, palmitic acid that is another one of the fatty acids may be used as the PCM.

In the illustrative embodiment of the present invention, however, the PCM having the aforementioned property is melted in a melting tank 11 of the apparatus 10 illustrated in FIG. 1, in which heat of 70 to 80° C. is applied to lauric acid so that the PCM is completely melted. Subsequently, the melted lauric acid liquid is sonicated with a vibration frequency of at least 3 MHz in an ultrasonic vibrator 12, so that the lauric acid is formed into liquid drops having a particular associated micro size and is simultaneously subject to ultrasonic vibration with a high vibration frequency (e.g., 30~100 Hz), and thus the melted lauric acid liquid is misted.

Continuously, the misted lauric acid, i.e., the PCM micro particle 15 in a size of 10 to 20 μm moves from a lower end of a glass tube 13a to a collection container 22 within a collection chamber 14 connected to an upper end of the glass tube 13b by a carrier gas 21, such as $N_2$, $O_2$, and Ar, injected to the glass tube 13 having a predetermined length.

In this case, first to fourth heat treatment zones 16, 17, 18, and 19 are sequentially arranged in a outer circumferential portion of the glass tube 13, so that the micro particle 15, prior to being solidified, passes through the first to fourth heat treatment zones 16, 17, 18, and 19 when moving to the upper end of the glass tube 13.

Especially, temperatures of the first to fourth heat treatment zones 16, 17, 18, and 19 are different, and the temperature becomes lower from the first heat treatment zone 16 to the fourth heat treatment zone 19. Accordingly, the misted lauric acid, i.e., the PCM micro particle 15, is stably solidified to be produced as the solidified micro particle 20.

Preferably, the temperature of the first heat treatment zone 16 is from 50 to 70° C., the temperature of the second heat treatment zone 17 is from room temperature to 50° C., the temperature of the third heat treatment zone 18 is from 10° C. to room temperature, and the temperature of the fourth heat treatment zone 19 is from 0 to 10° C.

In this case, the solidified micro particle 20 is collected in the collection container 22 within the collection chamber 14 via suction action of a suction motor 18, and thus the solid lauric acid micro particle having a size from 40 to 100 μm is collected in the collection container 22.

Next, the BN is micro pulverized for coating the solid lauric acid micro particle with the BN particle. For the micro pulverization of the BN, a high-energy ball milling system, e.g., a vertical planetary ball milling machine including a steel ball having a diameter of 25 mm therein, is used.

According to an exemplary embodiment, approximately 4 g of the BN is input in the to ball milling machine and a reaction gas ($N_2$, Ar, etc.) is simultaneously injected into the ball mill three or four times, a pressure of the ball milling machine is adjusted to 300 kPa in a milling, and then a milling is performed through application of the adjusted pressure. At this time, gas, such as $N_2$ and Ar, is injected into the ball mill at 1000° C. or higher and the BN is annealed, so that it is possible to obtain the micro pulverized plate-type BN having a diameter of 50 nm to 1 μm and a thickness of several nanometers (1 to 50 nm).

Next, a step of providing a functionality to the pure pulverized plate-type BN is progressed. For the functionalizing of the BN, the dispersed BN particle is mixed with an amine-terminated PEG of which an end is substituted with the amine group as a Lewis base by a weight ratio of BN:PEG=1:10 to 1:5, and the mixture is subjected to a heat reaction for four to six days.

In this case, in order to extract the PEG and deionize at the same time, the mixture of the BN and the PEG is dispersed with ultrasonic waves using a large amount of tetrahydrofuran as a solvent and centrifugation of 3000 rpm is repetitively performed three to five times, so that the solvent is evaporated, thereby obtaining the functionalized BN.

Next, the surface of the solid lauric acid micro particle is coated with the BN particle. That is, production of the micro particle for the thermal control material of the present invention in which the solid lauric acid micro particle is formed as a core and the BN particle is formed as a shell, is progressed.

To this end, the solid lauric acid micro particle and the BN particle are dispersed in a solvent phase.

Thus, it is necessary to find an appropriate pH range for simultaneously achieving cationizing (—$NH_2$→—$NH_3$+) of the amine group and anionizing (—COOH→—COOH—) of the —COOH group. Accordingly, the produced solid lauric acid micro particle and the BN particle are stirred in a buffer solution ranging from pH 2.34 to 9.69 by a weight ratio of BN:lauric acid=1:10 at room temperature for 24 hours, followed by wet milling by a wet milling machine for effective absorption.

The absorption is created between the solid lauric acid micro particle and the BN particle by electrostatic attraction according to the ionization of the solid lauric acid micro particle and the BN particle according to pH and a mechanical force by the wet milling, resulting in the completion of the micro particle for the thermal control material in which the solid lauric acid micro particle is formed as the core and the BN particle is formed as a shell.

In the meantime, a cleaning process of centrifuging the micro particle for the thermal control material by centrifugation at 1000 to 4000 rpm for 10 minutes, separating the supernatant, filling the centrifuge with water again, and dispersing the micro particle with ultrasonic waves, followed by additionally performing the centrifugation three to five more times, is further progressed.

The cleaned micro particle for the thermal control material is then dried, in which the cleaned micro particle for the thermal control material is vacuum dried at a temperature lower than a melting point of the lauric acid for 24 hours, thereby obtaining the BN-PCM micro particle, which is the micro particle for the thermal control material of the present invention.

Figure 2:
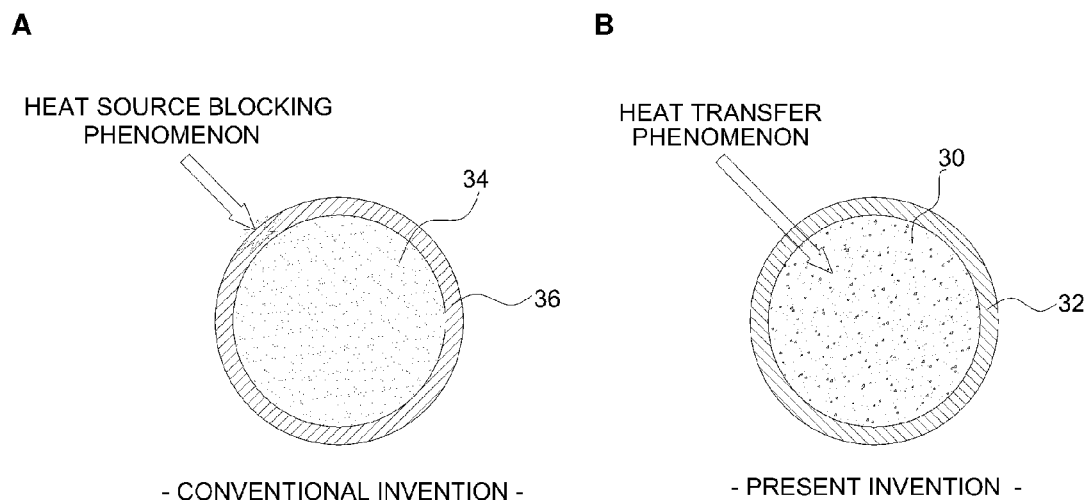
FIGS. 2A-2B is a conceptual view illustrating a comparison between a micro particle or a thermal control material of the exemplary embodiment of the present invention and an existing micro particle.

As illustrated in FIG. 2B, in the micro particle for the thermal control material of the present invention produced through the above processes, the solid lauric acid micro particle is formed as the core 30 and the BN particle is formed as the shell 32.

As illustrated in FIG. 2A, the conventional micro particle for the thermal control material have a structure in which the PCM is formed as a core 34 and a polymer resin layer is formed as a shell 36, so that the shell 36 formed of the polymer resin layer disadvantageously blocks a transfer of heat into a core region.

However, in the micro particle for the thermal control material of the present invention, the shell 32 formed of the BN particle serves to transfer a heat source to the core 30 formed of the PCM, i.e., the lauric acid micro cores, so that it is possible to increase the thermal conduction to the inside PCM, and thus the phase change is easily generated.

What is claimed is:

1. An apparatus for producing a micro particle for a thermal control material using an ultrasonic high-temperature vibration scheme, the apparatus comprising:

a melting tank for melting a Phase Change Material (PCM);

an ultrasonic high-temperature vibrator for sonicating and misting the PCM melted in the melting tank;

a glass tube in which a carrier gas for carrying a PCM micro particle misted in the ultra high-temperature vibrator is injected, wherein the glass tube being disposed in an upper end of the melting tank; and a collection container within a collection chamber configured to collect a micro particle solidified while being carried through the glass tube and disposed in an upper end of the glass tube thereof, wherein the glass tube comprises a plurality of heat treatment zones sequentially arranged in an outer peripheral portion thereof so as to solidify the PCM micro particle moving from a lower end of the glass tube to the upper end of the glass tube, and the plurality of heat zones is set to have a warmer temperature at the lower end and a cooler temperature at the upper along the glass tube.

2. The apparatus as claimed in claim 1, wherein the plurality of heat zones comprises a first, second, third and fourth heat treatment zones sequentially arranged in an outer peripheral portion thereof so as to solidify the PCM micro particle moving to the upper end of the glass tube.

3. The apparatus as claimed in claim 2, wherein a temperature of the first heat treatment zone is set to from 50 to 70° C., a temperature of the second heat treatment zone is set to from room temperature to 50° C., a temperature of the third heat treatment zone is set to from 10° C. to room temperature, and a temperature of the fourth heat treatment zone is set to from 0 to 10° C.

4. The apparatus as claimed in claim 1, wherein the collection container is connected with a suction motor for collecting a solidified micro particle by an absorption action.

* * * * *